United States Patent Office 3,090,003
Patented May 14, 1963

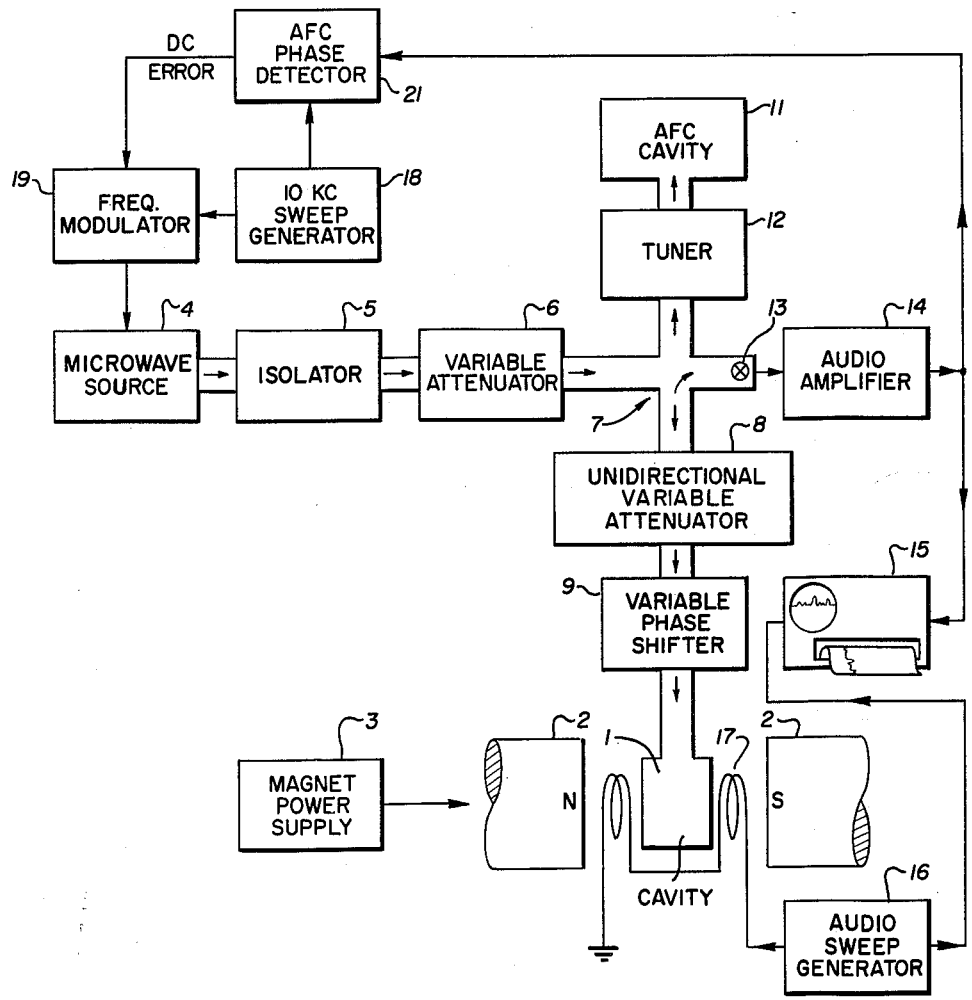

3,090,003
GYROMAGNETIC RESONANCE METHOD
AND APPARATUS
Robert C. Rempel, Los Altos, and Harry E. Weaver,
Portola Valley, Calif., assignors to Varian Associates,
Palo Alto, Calif., a corporation of California
Filed May 23, 1958, Ser. No. 737,340
16 Claims. (Cl. 324—.5)

The present invention relates in general to gyromagnetic resonance method and apparatus and more particularly to a novel gyromagnetic resonance spectrometer especially useful, for example, in observing gyromagnetic resonance at microwave frequencies.

Heretofore microwave bridge networks have been utilized for the observation and measurement of gyromagnetic resonance of electrons. In the typical prior art microwave bridge, utilized for this purpose, the sample under analysis was placed in one arm thereof and another arm thereof was suitably terminated such that in the presence of resonance of the electrons within the sample under analysis the bridge was unbalanced. The unbalance of the bridge was detected in a suitable crystal detector and displayed to indicate resonance. In these systems the bridge had to be operated at substantial power levels in the order of milliwatts, to operate the crystal detector in a linear range. However, when this substantial power level, needed for proper activation of the crystal, was applied to the sample of matter under investigation it produced saturation of the electrons spins thereby destroying the opportunity to observe the gyromagnetic resonance absorption mode. Therefore with the prior art microwave bridges it was only possible to observe the gyromagnetic resonance dispersion mode of the sample under analysis.

The present invention provides a novel gyromagnetic resonance spectrometer especially useful for observing electron paramagnetic resonance and includes a novel bridge network permitting the observation and measurement of both dispersive and absorptive gyromagnetic resonance characteristics. More specifically, a unidirectional variable attenuator is provided in the measuring arm for attenuating microwave energy applied to the sample while not substantially attenuating any of the energy reflected from the sample cavity at resonance. In this manner the bridge, exclusive of the sample under analysis, may be operated at substantial power levels to suitably activate the crystal detector while permitting small fluctuations in the reflected power from the sample cavity at resonance to be readily detected.

The principal object of the present invention is to provide a novel gyromagnetic resonance spectrometer especially useful, for example, in observing gyromagnetic resonance at microwave frequencies.

One feature of the present invention is the provision of a novel microwave bridge network including a unidirectional variable attenuator disposed in the measuring arm for variably attenuating the energy passed therethrough to the sample whereby the bridge may be operated at substantial power levels while exposing the measured sample to any desired low level of power.

Another feature of the present invention is the provision of a novel gyromagnetic resonance spectrometer system including a microwave bridge network having a sample under analysis disposed in the measuring arm thereof and including a unidirectional variable attenuator disposed in the measuring arm for controlling the power level applied to the sample while allowing changes in reflected energy from said sample at resonance to pass substantially unattenuated through said measuring arm to produce unbalance of the bridge.

Another feature of the present invention is the provision of a novel microwave bridge network useful for measuring the properties of matter at high frequencies including a sample of matter disposed within a measuring arm of the bridge, and an automatic frequency control cavity disposed within another arm of the bridge whereby the frequency of the microwave source may be controlled by the discriminaitng action of the automatic frequency control cavity while leaving the cavity containing the sample matter under analysis substantially free from the frequency control network thereby substantially enhancing frequency stability of the bridge.

Other features and advantages of the present invention will become apparent upon a perusal of the specification taken in connection with the accompanying drawings wherein, The drawing shows a schematic block diagram of a gyromagnetic resonance spectrometer including the novel features of the present invention.

Referring now to the drawing a sample of matter which it is desired to analyze is placed within a cavity resonator 1 and immersed in a polarizing magnetic field H produced, for example, by a magnet 2 which may be either of the permanent type or, in a preferred embodiment, of the electromagnetic type supplied with energy from a magnet power supply 3.

The cavity 1 containing the sample of matter is placed in a measuring arm of a suitable microwave bridge. The cavity is preferably placed at the end of said measuring arm. An automatic frequency control cavity 11 is disposed at the end of an automatic frequency control arm of the bridge. Microwave energy is fed to the bridge from a suitable high frequency source 4 as, for example, a klystron oscillator carried in a power arm of the bridge. A crystal detector 13 is disposed in the end of a detecting arm of the bridge and is matched thereto via a plurality of suitable matching screws, not shown. Microwave energy is fed from the source 4 via an isolator 5 and a variable attenuator 6 into the measuring and frequency control arms of the microwave bridge via a hybrid T 7.

A unidirectional variable attenuator 8 is provided in the measuring arm for variably attenuating the wave energy propagating therethrough to the cavity 1. The unidirectional characteristic of the attenuator 8 allows the reflected energy from the cavity 1 to pass from the cavity resonator 1 back to the hybrid T 7 substantially without attenuation. The unidirectional variable attenuator 8 allows the power level of the microwave energy applied to the cavity resonator 1 to be kept at a desirable low level as of, for example, in order of microwatts to prevent undesired saturation of the gyromagnetic bodies under analysis.

A variable phase shifter 9 is disposed between the sample cavity 1 and the unidirectional variable attenuator 8. The variable phase shifter 9 allows the phase of the energy supplied to and reflected from the cavity 1 to be varied as desired such that either the absorption or the dispersion mode of the sample of matter under investigation may be observed. This function of the variable phase shifter will be more fully described later.

The automatic frequency control cavity 11 is tunable and is coupled to the magic T 7 via a waveguide tuner 12 which may comprise, for example, a waveguide slidable screw tuner. The automatic frequency control cavity 11 serves to control the frequency of the microwave source 4 in a manner which will be more fully described later. The waveguide tuner 12 reflects a certain variably controllable amount of microwave energy back to the bridge. This reflected energy is variable in phase by adjustment of the tuner 12 as desired.

The crystal detector 13, disposed in the detecting arm of the bridge, is biased into its linear range by a portion of the microwave energy reflected from the automatic frequency control arm of the bridge. The D.C. output of the crystal detector 13 is fed to an audio amplifier 14 where it is amplified and thence fed to an indicator and recorder 15 where it is indicated and recorded as a function of time or a sweep signal obtained from a sweep generator 16. The sweep generator 16 serves to sweep the sample under analysis through gyromagnetic resonance by modulating the polarizing field through the intermediary of a pair of suitable electromagnetic coils 17.

In operation, microwave energy applied to the hybrid T 7 from the microwave source 4 splits and one-half of the energy is propagated into the measuring arm and the other half of the energy is propagated into the automatic frequency control arm. The energy that goes into the measuring arm is variably attenuated by the unidirectional variable attenuator 8 to preferably a low power level and passed through the variable phase shifter 9 and applied to the sample to excite resonance thereof. At resonance the wave energy reflected from the cavity 1 will vary in phase and magnitude with resonance of the sample. The varying reflected microwave energy, indicative of resonance, is propagated back through the measuring arm to the hybrid T 7 where a portion thereof is applied to the crystal detector 13.

A portion of the microwave energy propagated into the automatic frequency control arm is reflected back to the hybrid T 7 and into the crystal detector 13 where it is mixed with reflected energy from the sample of matter under investigation to produce a very low frequency D.C. signal in variable accordance with the resonance of the sample. The variable D.C. resonance signal is amplified in audio amplifier 14 and fed into the indicator and recorder 15.

An undesired portion of the energy reflected from both the automatic frequency control arm and the measuring arm combines at the hybrid T 7 and is reflected back into the power arm of the bridge. This reflected energy is partially attenuated in variable attenuator 6 and is heavily attenuated in isolator 5 thereby preventing the reflected energy from reaching the microwave source 4. If the reflected energy were allowed to reflect back to the microwave source 4 fluctuations in the balance of the microwave bridge would present a variable load on the microwave source and tend to produce undesired changes in the frequency thereof.

The variable attenuator 6 controls the general power level of the entire bridge apparatus and is varied as desired to produce proper operation thereof. The variable phase shifter 9 provided in the measuring arm allows either the absorption or the dispersion resonance mode of the sample to be observed by varying the phase of reflected energy from the cavity 1, as desired.

The unidirectional variable attenuator 8 may comprise for example, a microwave ferrite field displacement isolator having an adjustable magnetic shunt coupled thereto for varying the magnetic field applied to the ferrite elements therewithin. By varying the magnetic field the attenuation thereof may be varied as desired to control the microwave power level within the cavity 1.

An automatic frequency control network is employed to maintain the microwave source 4 on a desired frequency selected by the automatic frequency control cavity 11. More specifically, a sweep generator 18 supplies a relatively high audio frequency sinusoidal sweep signal as of, for example, 10 kc. to a suitable frequency modulator 19 for frequency modulating the output of the microwave source 4 for substantially equal frequency deviations above and below the center frequency thereof. The frequency modulated output of the microwave source 4 is thence fed to the automatic frequency control cavity 11 which is tuned to the desired frequency of the microwave source 4.

When the center frequency of the microwave source 4 is precisely at the same center frequency as the automatic frequency control cavity 11 there will be energy absorbed by the cavity from the microwave source 4 twice during each frequency modulation sweep cycle. This double absorption per sweep cycle of the microwave source 4 produces a strong second harmonic of the 10 kc. sweep signal in the output of the crystal detector 13. On the other hand, if the center frequency of the microwave source 4 is not at the center frequency of the automatic frequency control cavity 11 the cavity 11 will have only one maximum absorption from the microwave source 4 per cycle of the frequency modulation sweep. This means that there will be a substantial fundamental component at the frequency modulation sweep frequency produced in the output of the crystal detector 13. The phase and the magnitude of this fundamental component will depend upon sense and degree that the frequency of the microwave source 4 is above or below in frequency the center frequency of the automatic frequency control cavity 11. The fundamental error signal is amplified in audio amplifier 14 and thence fed to the input of a frequency control phase sensitive detector 21 wherein it is compared with a signal derived from the 10 kc. sweep generator 18 to obtain a D.C. error signal which is applied back to the frequency modulator 19 for centering the frequency of the microwave source 4.

In a preferred embodiment of the present invention the microwave source 4 comprises a reflex klystron oscillator and the frequency modulator 19 comprises a reflex klystron reflector power supply which serves to vary the frequency of the reflex klystron oscillator by varying the reflector voltage. The D.C. automatic frequency control error signal serves to control the D.C. reflector voltage and the frequency modulation of the klystron oscillator is obtained by modulating the reflector supply voltage at the frequency of the sweep generator 18.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A high frequency bridge apparatus for measuring a property of a sample by observing the unbalancing effect on the bridge obtained by action of the sample disposed in a first arm of the bridge on high frequency wave energy applied to the bridge and sample from a power source of wave energy disposed in a second arm of the bridge comprising, a unidirectional attenuator disposed in a measuring arm portion of the bridge, said measuring arm serving to transmit high frequency wave energy derived from the source to the sample contained in said measuring arm portion of said bridge and to transmit the wave energy derived from the source after being reflected from the sample back to other portions of the bridge, said unidirectional attenuator being disposed in said measuring arm in the path of wave energy traveling toward the sample from the power source of high frequency wave energy disposed in the second arm of said bridge for attenuating the power source derived wave energy traveling to the sample but not substantially attenuating the power source derived portion of high frequency wave energy after being reflected from the sample and traveling back to the other portions of the bridge to produce unbalance thereof.

2. The apparatus according to claim 1 wherein said unidirectional attenuator is a variable attenuator for variably controlling the power level of energy applied to the sample being measured as desired.

3. In a gyromagnetic resonance spectrometer apparatus, a high frequency bridge network having a measuring arm, a detecting arm, and a power source arm, said power source arm including a power source of wave energy coupling wave energy into said power source arm for supplying wave energy to said bridge and to said measuring arm thereof via said power source arm, a multiport network for coupling together a plurality of said arms of said bridge, and means disposed in the measuring arm of said bridge network for unidirectionally attenuating wave energy traveling toward the sample of matter under investigation from said power source via said multiport network whereby the wave energy power level applied to the sample may be kept at a low level without substantially attenuating reflected wave energy traveling toward said multiport network after reflection from the sample thereby preventing undesired saturation of the sample in use.

4. In a gyromagnetic resonance spectrometer apparatus, a high frequency bridge network having a plurality of arms including, a multiport network for coupling together the arms of said bridge, means for applying high frequency wave energy to a sample of matter under investigation coupled to one port of said multiport network and forming a measuring arm of said bridge, means for supplying high frequency wave energy to said bridge network forming a portion of a second arm of said bridge and being coupled to a second port of said multiport network, means for detecting fluctuations in the balance of said high frequency bridge at resonance of the sample of matter under analysis, said detecting means being coupled to a third port of said multiport network and forming a portion of the detecting arm of said bridge, said measuring arm including means connected in circuit with said measuring arm between said multiport network and the sample for unidirectionally attenuating wave energy traveling toward the sample from said multiport network for decreasing the power level of high frequency wave energy applied to the sample without substantially attenuating reflected wave energy traveling toward said multiport network after reflection from the sample whereby undesired saturation of the sample may be prevented in use.

5. The apparatus according to claim 4 wherein said unidirectional attenuating means comprises a variable unidirectional attenuator for variably controlling the power level of high frequency energy applied to the sample under analysis.

6. The apparatus according to claim 4 including means for variably phase shifting the energy reflected from the measuring arm of said bridge back into said multiport network whereby either the absorption or dispersion resonance characteristic of the sample of matter under analysis may be observed.

7. The apparatus according to claim 4 including, means for automatically controlling the frequency of said means for supplying high frequency energy to said bridge, said automatic frequency control means including a cavity resonator coupled to a fourth port of said multiport network and forming a portion of an automatic frequency control arm of said bridge whereby the frequency stability of the spectrometer apparatus is greatly enhanced.

8. A gyromagnetic resonance spectrometer apparatus including; a microwave bridge network having a plurality of arms, and a multiterminal network coupling together a plurality of said arms of said bridge; said bridge network including a measuring arm connected to said multiterminal network and having a cavity resonator disposed therein for containing therewithin a sample of matter under investigation, a variable phase shifter connected in said measuring arm between said multiterminal network and said cavity resonator for shifting the phase of the energy applied to and reflected from said cavity resonator for observing either the dispersion or absorption resonance mode of the sample of matter under investigation and a unidirectional variable attenuator disposed in said measuring arm between said multiterminal network and said cavity for variably attenuating the wave energy applied to the sample of matter under investigation as desired without substantially attenuating wave energy reflected from said cavity resonator whereby the power level applied to the sample of matter under investigation may be controlled to prevent undesired saturation thereof; said bridge having a power arm for supplying wave energy thereto, said power arm including a microwave source for supplying high frequency wave energy, an isolator for heavily attenuating wave energy reflected from the bridge back toward said microwave source to prevent undesired fluctuations in the load presented to said microwave source, and a variable attenuator between said source and said multiterminal network for controlling the power level applied to said bridge; said bridge having an automatic frequency control arm, said automatic frequency control arm including an automatic frequency control cavity tuned to the desired operating frequency of the bridge and adapted to unbalance the bridge for signals applied thereto and not of the correct frequency; said bridge network having a detecting arm, said detecting arm including means for detecting unbalance of said bridge network and for deriving a low frequency signal in variable accordance with unbalance of said bridge, means for amplifying the detected low frequency signal, and means for indicating the signal as desired.

9. A high frequency microwave measuring network including, a measuring arm for holding a sample of matter under investigation, a detecting arm, a power source arm, and a multiterminal network for coupling a plurality of said arms together, and means disposed in the measuring arm of said microwave network between said multiterminal network and the sample for unidirectionally attenuating wave energy traveling toward the sample of matter under investigation from said multiterminal network whereby the power level applied to the sample may be kept on a low level without substantially attenuating reflected energy after being reflected from the sample back toward said multiterminal network thereby preventing undesired saturation of the sample in use.

10. In a gyromagnetic resonance spectrometer apparatus; a high frequency microwave measuring network having a plurality of arms and including, a multiport network for coupling together the arms of said microwave network, means for applying high frequency wave energy to a sample of matter under investigation coupled to one port of said multiport network and forming a measuring arm of said measuring network, means for supplying high frequency wave energy to said measuring network and forming a portion of a second arm of said measuring network and being coupled to a second port of said multiport network, means for detecting fluctuations in the balance of said high frequency measuring network at resonance of the sample of matter under analysis, said detecting means being coupled to a third port of said multiport network and forming a portion of a detecting arm of said measuring network, said measuring arm including means connected in circuit with said measuring arm between said multiport network and the sample for unidirectionally attenuating wave energy traveling toward the sample from said multiport network for decreasing the power level of high frequency wave energy applied to the sample without substantially attenuating reflected energy after being reflected from the sample whereby undesired saturation of the sample may be prevented in use.

11. The apparatus according to claim 10 including, means for automatically controlling the frequency of said means for supplying high frequency energy to said measuring network, said automatic frequency control means being coupled to a fourth port of said multiport network and forming a portion of an automatic frequency control arm of said measuring network whereby the frequency stability of the spectrometer apparatus is greatly enhanced.

12. The apparatus according to claim 11 wherein said means for automatically controlling the frequency of said energy supplying means includes, a cavity resonator disposed in the automatic frequency control arm of said measuring network.

13. The apparatus according to claim 12 wherein said means for automatically controlling the frequency of said energy supplying means includes, means for intentionally frequency modulating the output of said high frequency energy supplying means to derive a signal for controlling the frequency of said high frequency energy supplying means.

14. In a gyromagnetic resonance spectrometer apparatus; a high frequency microwave measuring network having a plurality of arms and including, a multiterminal network for coupling together the arms of said microwave network, means for applying high frequency wave energy to a sample of matter under investigation coupled to one terminal of said multiterminal network and forming a measuring arm of said measuring network, means for supplying high frequency wave energy to said measuring network and forming a portion of a second arm of said measuring network and being coupled to a second terminal of said multiterminal network, means for detecting fluctuations in the balance of said high frequency measuring network at resonance of the sample of matter under analysis, said detecting means being coupled to a third terminal of said multiterminal network and forming a portion of a detecting arm of said measuring network, means for automatically controlling the frequency of said means for supplying high frequency energy to said measuring network, said automatic frequency control means being coupled to a fourth terminal of said multiterminal network and forming a portion of an automatic frequency control arm of said measuring network whereby the frequency stability of the spectrometer apparatus is greatly enhanced, said automatic frequency control arm of said measuring network including a cavity resonator, and means for intentionally frequency modulating the output of said high frequency energy supplying means to derive a signal for controlling the frequency of said high frequency energy supplying means.

15. The apparatus according to claim 14 wherein said automatic frequency control means includes a detector means connected to one terminal of said multiterminal network for demodulating the frequency modulation applied to said multiterminal network and as reflected from said automatic frequency control arm of said measuring network, and means for comparing the detected frequency modulated components with the applied frequency modulated components to obtain an error signal for controlling the frequency of said energy supplying means, whereby randomly produced frequency modulation of said high frequency wave energy supplying means is minimized in use.

16. The apparatus according to claim 15 wherein said measuring arm includes means for unidirectionally attenuating wave energy applied to the sample for decreasing the power level of high frequency wave energy applied to the sample without substantially attenuating reflected energy from the sample whereby undesired saturation of the sample may be prevented in use.

References Cited in the file of this patent
UNITED STATES PATENTS

| | | |
|---|---|---|
| 2,748,353 | Hogan | May 29, 1956 |
| 2,798,197 | Thurston | July 2, 1957 |

OTHER REFERENCES

L'Onde Electrique, vol. 35, No. 338, May 1955, section entitled: Resonance Paramagnetique Electronique, pp. 489 to 495.

Strandberg et al.: Review of Scientific Instruments, vol. 27, No. 8, August 1956, pp. 596 to 605.

White et al.: Physical Review, vol. 104, No. 1, October 1956, pp. 56 to 62.

Lacroix: Helvetica Physica Acta, vol. 27, 1954, pp. 293 to 300 principally relied on.

Ingram Spectroscopy at Radio and Microwave Frequencies, London, Butterworths Scientific Publications, 1955, pp. 34, 56–59, 86, 87, and 96 relied on.

Portis: The Physical Review, vol. 91, No. 5, Sept. 1, 1953, pp. 1071–1078.